United States Patent [19]

Horacek et al.

[11] Patent Number: 5,087,384
[45] Date of Patent: Feb. 11, 1992

[54] MELAMINE PREPARATION AND STABLE DISPERSION OF MELAMINE IN POLYETHER POLYOLS

[75] Inventors: Heinrich Horacek; Friedl Heger; Gerhard Coufal, all of Linz, Austria

[73] Assignee: Chemie Linz Gesellschaft m.b.H., Linz, Austria

[21] Appl. No.: 497,252

[22] Filed: Mar. 22, 1990

[30] Foreign Application Priority Data

Apr. 4, 1989 [AT] Austria ................................. 781/89

[51] Int. Cl.$^5$ .................... C08G 18/14; C08G 18/48
[52] U.S. Cl. ..................... 252/182.14; 252/182.17; 252/182.23; 252/182.24; 252/182.27; 252/308; 252/609; 252/610; 252/611; 521/128; 521/130; 521/170; 521/174; 521/189; 521/903; 521/906
[58] Field of Search ........... 521/128, 130, 170, 174, 521/189, 903, 906; 252/182.17, 182.24, 182.27, 308, 182.14, 182.23, 609, 610, 611

[56] References Cited

U.S. PATENT DOCUMENTS

| | | | |
|---|---|---|---|
| 2,975,146 | 3/1961 | Rogers et al. | 521/121 |
| 3,717,597 | 2/1973 | Hesskamp et al. | 521/906 |
| 4,221,875 | 9/1980 | Yukuta et al. | 521/128 |
| 4,293,657 | 10/1981 | Nissen et al. | 521/123 |
| 4,385,131 | 5/1983 | Fracalossi et al. | 521/55 |
| 4,440,705 | 4/1984 | Nissen et al. | 521/914 |
| 4,481,308 | 11/1984 | Gray et al. | 521/120 |
| 4,590,219 | 5/1986 | Nissen et al. | 521/51 |
| 4,636,531 | 1/1987 | Schmidt et al. | 521/163 |
| 4,644,015 | 2/1987 | Scaccia et al. | 521/129 |
| 4,668,708 | 5/1987 | Mueller et al. | 521/159 |
| 4,745,133 | 5/1988 | Grinbergs et al. | 521/128 |
| 4,798,851 | 1/1989 | Werner et al. | 521/137 |
| 4,826,884 | 5/1989 | Grace et al. | 521/128 |
| 4,849,459 | 7/1989 | Grace et al. | 521/110 |
| 4,892,893 | 1/1990 | Grace et al. | 521/906 |

FOREIGN PATENT DOCUMENTS

2163762 3/1986 United Kingdom .

OTHER PUBLICATIONS

K. E. J. Barrett, "Dispersion Polymerisation in Organic Media", FIGS. 6, 2, John Wiley, London 1975.
M. Genz, O. M. Grace, S. Gagnon, PRI-Urethane Group International Symposium, "New Flame Resistant Flexible Foams" (Oct. 14, 1987).

Primary Examiner—Maurice J. Welsh
Assistant Examiner—Rabon Sergent
Attorney, Agent, or Firm—Wenderoth, Lind & Ponack

[57] ABSTRACT

A melamine preparation consisting of 80 to 99.9% by weight of melamine having an average particle size of 0.01 to 0.1 mm and 0.1 to 20% by weight of urea, thiourea, biuret or urea or thiourea substituted by lower alkyl groups and a stable dispersion in polyether polyols prepared therefrom, which is used for the preparation of flame-resistant polyurethane foams.

8 Claims, No Drawings

MELAMINE PREPARATION AND STABLE DISPERSION OF MELAMINE IN POLYETHER POLYOLS

The invention relates to a melamine preparation containing melamine and urea, thiourea, biuret or urea or thiourea substituted by lower alkyl groups, a stable dispersion prepared therefrom in polyether polyols and their use for the preparation of polyurethane foams.

When flame-resistant polyurethane foams are prepared, it has proven to be particularly advantageous to use melamine as fire retardant. This is done by reacting a dispersion of melamine in a polyol with isocyanate, foaming agents and customary additives and auxiliaries. A disadvantage of the melamine-polyol dispersions is that they have to be processed immediately, since the melamine already forms a sediment after a short period of time. It is known from U.S. Pat. No. 4,293,657 that the shelf life of melamine-polyol dispersions can be increased by using finely ground melamine having a particle size of less than 0.01 mm and by using silica, perfluorinated alkylcarboxylic acids, alkylsulphonic acids, polyperfluoroether polyols or fatty alcohol sulphates as stabilizers. The disadvantage of these polyol dispersions is in particular that the melamine has to be ground in an additional process step using a lot of energy. A further disadvantage of these small particles is that they lead to dispersions which have high viscosities and, as a result of this, are difficult to handle and to process further (K. E. J. Barrett, Dispersion Polymerisation in Organic Media, FIG. 6, 2, John Wiley, London 1975). Moreover, foams which are prepared from dispersions having such small particles have poor mechanical properties (M. Genz, O. M. Grace, S. Gagnon, PRI-Urethane Group International Symposium, "New Flame Resistant Flexible Foams", Oct. 14, 1987).

Accordingly, the object of the invention was to find a stable non-foaming melamine-polyol dispersion and a melamine preparation for the preparation of this dispersion in which these disadvantages do not occur. Surprisingly, the object is achieved by means of melamine preparations or melamine-polyol dispersions prepared therefrom and containing urea, thiourea, biuret or urea or thiourea substituted by lower alkyl groups.

Accordingly, the present invention relates to a melamine preparation consisting of 80 to 99.9% by weight, preferably 80 to 99.3% by weight, of melamine having an average particle size of 0.01 to 0.1 mm and 0.1 to 20% by weight, preferably 0.7 to 20% by weight, of urea, thiourea, biuret or urea or thiourea substituted by lower alkyl groups for the preparation of a stable dispersion in polyether polyols, in which 0 to 50% by weight of melamine can be replaced by further fire retardants.

The invention also relates to the use of this melamine preparation consisting of 80 to 99.9% by weight, preferably 80 to 99.3% by weight, of melamine having an average particle size of 0.01 to 0.1 mm and 0.1 to 20% by weight, preferably 0.7 to 20% by weight, of urea, thiourea, biuret or urea or thiourea substituted by lower alkyl groups for the preparation of a stable dispersion in polyether polyols, in which 0 to 50% by weight of melamine can be replaced by further fire retardants.

The invention further relates to a stable dispersion of melamine in polyether polyols having a melamine content of 20 to 70% by weight and, if desired, further customary additives, characterized in that said dispersion contains 0.1 to 5% by weight of urea, thiourea, biuret or urea or thiourea substituted by lower alkyl groups, in that the average particle size of the melamine is 0.01 to 0.1 mm and in that 0 to 50% by weight of melamine can be replaced by further fire retardants.

The melamine used is commercially available, for example from Chemie Linz, and an additional grinding process for reducing the particle size is not required. An average particle size of 0.01 to 0.1 mm is understood to mean that at least 90% by weight of the particles have a particle size of 0.01 to 0.1 mm (DIN 66141). The melamine content of the dispersion is 20 to 70% by weight, a high melamine content in the foam leading to increased fire retardancy of the final product but also to higher viscosity of the dispersion. A dispersion having a solids content of, for example, 50% by weight consisting of melamine and urea, biuret or urea or thiourea substituted by lower alkyl groups has a viscosity which is about 5 to 15 times higher than that of the polyether polyol used.

Urea, thiourea, biuret and urea and thiourea substituted by lower alkyls are also commercially available. They are used in amounts of 0.1 to 5% by weight, preferably 0.5 to 5% by weight, relative to the ready-to-use dispersion. Examples of suitable substituted ureas or thioureas are mono-, di-, tri- and tetraalkylureas, arylureas, alkylarylureas, alkylol- and alkyleneureas, or N-acylureas, such as, for example, monomethylurea, dimethylurea, O-methylurea, diphenylurea, ethylene- and propyleneurea, isourea and triuret. In addition to the stabilizing effect on the dispersion, the viscosity of the dispersion also increases with increasing amounts of urea derivatives. The viscosity of the dispersion stabilized according to the invention is, however, lower than that of comparable known dispersions having a melamine particle size of less than 0.01 mm.

Suitable polyether polyols are all polyether polyols customary in polyurethane preparation, for example polymers or polycondensation products prepared from ethylene oxide, propylene oxide or tetrahydrofuran. The molecular weight of the polyether polyols is usually in the range from about 200 to 6,500 g/mol, and the OH number is about 25 to 600, preferably 20 to 40. It is also possible to use polymer-modified polyols, such as are described, for example, in GB-A 2,163,762, said polyols containing dispersion polymers, for example alkanolamine-isocyanate polyaddition polymers, for the purpose of influencing the cell structure during the preparation of polyurethane foams. These types of polymer-modified polyether polyols are, for example, Desmophen ® 3699 or 7652 from Bayer, Multranol ® 9225 from Mobay, Niax ® 34-28 from UCC, Polyurax ® 1408 from BP, Voranol ® 8020 from Dow or Pluracol ® 581 from BWC. Unmodified polyether polyols are, for example, Desmophen ® 3900 from Bayer or Caradol ® 36-3 from Shell. It is also possible to use mixtures of different polyols.

The melamine preparation or the melamine-polyether-polyol dispersion can, if desired, in addition to melamine, contain further fire retardants, for example those containing phosphorus or halogen, such as, for example, N-2,4,6-tribromophenylmaleimide (Chemie Linz), guanidinium bis(dibromo)neopentylglycol borate (SA 136 from Chemie Linz), tris(1,3-dichloropropyl) phosphate (Amgard ® TDCP/LV from Albright and Wilson), bis(2-chloroethyl) hydrogen phosphate, 2,2-bis(-chloromethyl)-1,3-propanediol hydrogen phosphate, tetrakis(2-chloroethyl)ethylene diphosphate (Thermolin 101, from Olin) and tris(dichloroethyl) phosphate (Disflamoll TCA from Bayer), guanidinium bis(dibromo)neopentylglycol borate giving particularly good results.

Blowing agents which are usually added to the dispersion are water or halogenated hydrocarbons, for example trichlorofluoromethane, dichlorodifluoromethane or methylene chloride.

Furthermore, the melamine-polyether-polyol dispersions can contain additives which are customary in polyurethane preparation, such as, for example, catalysts, chain-lengthening agents, crosslinking agents, foam stabilizers, pore-controlling agents, stabilizers, fillers and auxiliaries. Examples of suitable catalysts are tin octoate, dibutyltin dilaurate or diazobicyclooctane (e.g. Dabco ® 33LV from Air Products), examples of suitable foam stabilizers are silane copolymers such as, for example, silicon 5043 from Dow Corning, examples of suitable crosslinking agents are diethanolamine or glycerol, and examples of suitable chain-lengthening agents are butanediol or ethylene glycol.

The dispersions according to the invention are easy to prepare and do not foam. They are prepared by simply stirring melamine and urea, thiourea, biuret or urea or thiourea substituted by lower alkyl groups and the additives desired in each case at temperatures of about 20° to 80° C., followed by homogenization, for example using a conventional anchor stirrer. It is not necessary to use a ball mill.

The dispersions are preferably used for the preparation of fire-retardant polyurethane foams. The preparation of the foams can be achieved, for example, as described in U.S. Pat. No. 4,293,657, by reaction of the dispersions with an isocyanate, for example with diphenylmethane diisocyanate or toluylidene diisocyanate with the addition of foaming agents. The dispersion used can, if desired, be further diluted with a polyol before the reaction. Since the dispersions do not contain any surface-active substances, such as, for example, emulsifiers or soaps, the reaction proceeds in a controlled manner with the formation of a uniform cell structure and without any interference with the foaming behaviour supported by foam stabilizers.

The urea used in the examples below (fine-prilled, Chemie Linz) had an average particle size of 0.5 mm. The melamine used (Chemie Linz) had a particle size distribution, measured according to DIN 66141, in which 95% by weight of the particles had a particle size between 0.01 and 0.1 mm.

COMPARATIVE EXAMPLE C1

In a 1 m³ stirred reactor equipped with an anchor stirrer, 325 kg of a polymer-modified polyether polyol having a viscosity of 1600 mPas, measured at 25° C., (consisting of Polyurax ® 1408 from BP) were initially introduced, and 325 kg of melamine, leading to a melamine content of the dispersion of 50% by weight, were stirred in at 50° C. and a stirring rate of 45 rpm over a period of 30 minutes. Stirring was then continued for 90 minutes to homogenize the dispersion. The dispersion obtained had a viscosity of 15,000 mPas (20° C.) and formed a sediment within 3 days.

COMPARATIVE EXAMPLE C2

Analogously to Comparative Example C1, a melamine dispersion was prepared, in which, however, an unmodified polyether polyol consisting of Desmophen ® 3900 from Bayer having a viscosity of 850 mPas, measured at 25° C., and an OH number of 35 was used instead of the polymer-modified polyo. The dispersion obtained had a viscosity of 6000 mPas (20° C.), had a short shelf life and formed a sediment within 3 days.

EXAMPLE 1

In a 1 m³ stirred reactor equipped with an anchor stirrer, 325 kg of a polymer-modified polyether polyol consisting of Polyurax ® 1408 from BP were initially introduced, and a mixture of 321 kg of melamine and 4 kg of urea was stirred in at 50° C. and a stirring rate of 45 rpm over a period of 30 minutes. Stirring was then continued for 90 minutes to homogenize the dispersion. The viscosity of the dispersion obtained was 20,000 mPas (20° C.), and its shelf life was longer than 6 months without forming a sediment.

EXAMPLES 2 TO 17

Analogously to Example 1, melamine dispersions in the polyether polyols listed in Tables 1 and 2 and additions of the amounts of melamine and urea or urea derivatives given in Table 2 were prepared. In Example 8, 10% by weight of tris(dichloropropyl) phosphate (TDCP) were added as additional fire retardant. In Example 10, 10% by weight of TDCP and 25% by weight of guanidinium bis(dibromo)neopentylglycol borate (SA 136 from Chemie Linz) were used as additional flame retardants. In Example 13, an additional 5% by weight of tris(dichloroethyl) phosphate (TCA), in Example 14, 5% by weight of Thermolin ® 101, in Example 18, 15% by weight of SA 136 and 10% by weight of TDCP were added.

The shelf lives of all dispersions were more than 6 months without leading to sedimentation.

PREPARATION OF FOAMS

The melamine-polyether-polyol dispersions obtained according to Examples C1, C2, 1 to 8, 13 to 16 and 18 were mixed in each case according to the following recipe:

80 parts by weight of melamine dispersion, 60 parts by weight of the particular polyol, 1.5 parts by weight of water as foaming agent, 0.05 part by weight of dibutyltin dilaurate as catalyst, 0.5 part by weight of 85% diethanolamine as crosslinking agent and 0.08 part by weight of Dabco ® 33LV (33% solution of triethylenediamine in dipropylene glycol, from Air Products) as catalyst, 1.0 part by weight of silicon 5043 (Dow Corning) as foam stabilizer, 5 parts by weight of Thermolin ® 101 (tetrakis(2-chloroethyl)ethylene diphosphate, from Olin) and 10 parts by weight of Frigen ® 11 (Hoechst).

This mixture was then stirred with 22 parts by weight of toluylidene diisocyanate (TDI 80 from Bayer) for 3 seconds and was poured into an open ingot mould to form the polyurethane foam.

The polyurethane foam obtained was tested with respect to tensile strength (DIN 53571), tear propagation resistance (DIN 53575), compression set at 90% (DIN 53572), density (DIN 53420) and its flame behaviour (BS 5852-2). In accordance with BS 5852-2, about 1 kg of the polyurethane foam are exposed to a flame by means of crib 5, the maximum allowable weight loss being 60 g. The weight loss of the samples having a melamine content of more than about 30% by weight was less than this value. The values together with the mechanical properties of the plasticized foams are listed in Table 3.

TABLE 1

| Polyether polyols used | | OH number | Viscosity/ 25° C. (mPas) | Example |
|---|---|---|---|---|
| a) Unmodified polyether polyols | | | | |
| Caradol ® 36-3 | Shell | 36 | 850 | 4, 5, 6, 8, 9, 10, 15, 16, 18 |
| Desmophen ® 3900 | Bayer | 35 | 850 | 7, C2 |
| b) Polymer-modified polyether polyols | | | | |
| Desmophen ® 7652 | Bayer | 31 | 1500 | 3 |
| Polyurax ® 1408 | BP | 30 | 1600 | C1, 1 |
| Voranol ® CP 8020 | DOW | 30 | 1250 | 2, 11, 12, 13, 14, 17 |

TABLE 2

Melamine dispersions in polyether polyols

| | Melamine (% by weight) | Urea or urea derivatives* (% by weight) | Polyether polyol | Viscosity/ 20° (mPas) | Density/ 20° C. (g/ml) |
|---|---|---|---|---|---|
| C1 | 50 | — | Polyurax 1408 | 15,000 | 1.25 |
| C2 | 50 | — | Desmophen 3900 | 6,000 | 1.22 |
| 1 | 49.5 | 0.5 U | Polyurax 1408 | 20,000 | 1.22 |
| 2 | 49.5 | 0.5 U | Voranol CP 8020 | 10,000 | 1.22 |
| 3 | 49.5 | 0.5 U | Desmophen 7652 | 14,000 | 1.22 |
| 4 | 49.5 | 0.5 U | Caradol 36-3 | 9,000 | 1.22 |
| 5 | 49.9 | 0.1 U | Caradol 36-3 | 10,000 | 1.22 |
| 6 | 49 | 1 B | Caradol 36-3 | 15,000 | 1.22 |
| 7 | 49.5 | 0.5 U | Desmophen 3900 | 9,000 | 1.22 |
| 8 | 49.5 10 TDCP | 0.5 U | Caradol 36-3 | 16,000 | 1.22 |
| 9 | 29 | 1.0 B | Caradol 36-3 | 5,000 | 1.15 |
| 10 | 24.5 25 SA 136 10 TDCP | 0.5 U | Caradol 36-3 | 20,000 | 1.22 |
| 11 | 45 | 5.0 B | Voranol CP 8020 | 14,000 | 1.15 |
| 12 | 70 | 0.1 U | Voranol CP 8020 | 80,000 | 1.35 |
| 13 | 49.5 5 TCA | 0.5 T | Voranol CP 8020 | 25,000 | 1.30 |
| 14 | 49.5 5 Thermolin | 0.5 U | Voranol CP 8020 | 15,000 | 1.30 |
| 15 | 49 | 1 M | Caradol 36-3 | 9,000 | 1.22 |
| 16 | 49 | 1 B | Caradol 36-3 | 9,000 | 1.22 |
| 17 | 39.6 | 0.1 U 0.1 M 0.1 T 0.1 B | Voranol CP 8020 | 8,000 | 1.20 |
| 18 | 24 15 SA 136 10 TDCP | 1 B | Caradol 36-3 | 7,000 | 1.25 |

*U (urea), M (methylurea), T (thiourea), B (biuret)

TABLE 3

| | Plasticized foams | | | | | |
|---|---|---|---|---|---|---|
| | Density (kg/m³) | Tear propagation resistance (N/m) | Tensile strength (kPa) | Compression set at 90% of deformation (%) | Flame behaviour weight loss (g) | Sample weight (g) |
| C1 | 40 | 290 | 100 | 10 | 19 | 1010 |
| C2 | 38 | 275 | 90 | 11 | 20 | 960 |
| 1 | 40 | 305 | 105 | 8 | 11 | 1015 |
| 2 | 39 | 320 | 95 | 9 | 15 | 990 |
| 3 | 38 | 280 | 100 | 8 | 16 | 960 |
| 4 | 40 | 310 | 110 | 10 | 18 | 1015 |
| 5 | 38 | 290 | 95 | 7 | 19 | 960 |
| 6 | 39 | 270 | 95 | 6 | 17 | 990 |
| 7 | 40 | 280 | 110 | 8 | 20 | 1010 |
| 8 | 37 | 275 | 105 | 9 | 10 | 940 |
| 13 | 41 | 290 | 100 | 7 | 20 | 1030 |
| 14 | 38 | 300 | 110 | 8 | 15 | 960 |
| 15 | 39 | 310 | 105 | 11 | 12 | 990 |
| 16 | 37 | 300 | 110 | 9 | 22 | 940 |
| 18 | 40 | 330 | 110 | 5 | 8 | 1005 |

What we claim is:

1. Melamine preparation capable of forming a stable dispersion of melamine in polyether polyols, said preparation consisting of 80 to 99.9% by weight of melamine, as a flame retardant, having an average particle size of 0.01 to 0.1 mm and 0.1 to 20% by weight of urea, thiourea, biuret or urea or thiourea substituted by lower alkyl groups, in which 0 to 50% by weight based on the melamine component, of melamine, is optionally replaced by further fire retardants.

2. Melamine preparation according to claim 1, wherein said preparation contains 80 to 99.3% by weight of melamine and 0.7 to 20% by weight of urea, thiourea, biuret or urea or thiourea substituted by lower alkyl groups.

3. Stable dispersion of melamine, as a flame retardant, in polyether polyols having a melamine content of 20 to 70% by weight, wherein said dispersion contains 0.1 to 5% by weight of urea, thiourea, biuret or urea or thiourea substituted by lower alkyl groups, and wherein the average particle size of the melamine is 0.01 to 0.1 mm and wherein 0 to 50% by weight based on the melamine component, of melamine, is optionally replaced by further fire retardants.

4. Stable dispersion according to claim 3, wherein said dispersion contains 0.5 to 5% by weight of urea, thiourea, biuret or urea or thiourea substituted by lower alkyl groups.

5. Stable dispersion according to claim 3, wherein the polyether polyols have an OH number of 20 to 40.

6. Melamine preparation according to claim 1, wherein the further fire retardant which is optionally added is guanidinium bis(dibromo)neopentylglycol borate.

7. Process for the preparation of flame-resistant polyurethane foams by reaction of isocyanates, polyols, foaming agents, wherein the polyol used is a dispersion of melamine, as a flame retardant, in polyether polyols, said dispersion having a melamine content of 20 to 70% by weight and, wherein said dispersion contains 0.1 to 5% by weight of urea, thiourea, biuret or urea or thiourea substituted by lower alkyl groups, wherein the average particle size of the melamine is 0.01 to 0.1 mm and wherein 0 to 50% by weight based on the melamine component, of melamine, is optionally replaced by further fire retardants.

8. Method for the preparation of a stable dispersion of 20 to 70% by weight, based on the dispersion, of melamine, as a flame retardant, said melamine having an average particle size of 0.01 to 0.1 mm, in which 0 to 50% by weight, based on the melamine component, of melamine, is optionally replaced by further flame retardants, wherein 0.1 to 5% by weight, based on the dispersion, of urea, thiourea, biuret or urea or thiourea substituted by lower alkyl groups is added to the dispersion for use as a stabilizer of the dispersion.

* * * * *